United States Patent
Honda et al.

(10) Patent No.: US 9,247,445 B2
(45) Date of Patent: Jan. 26, 2016

(54) WIRELESS SENSOR MODULE, METHOD FOR PROCESSING MEASUREMENT DATA THEREBY, AND RECORDING MEDIUM

(75) Inventors: Masahito Honda, Tokyo (JP); Keiki Matsuura, Nara (JP); Masashi Doi, Shiga (JP)

(73) Assignee: OMRON Corporation, Kyoto (JP)

( * ) Notice: Subject to any disclaimer, the term of this patent is extended or adjusted under 35 U.S.C. 154(b) by 17 days.

(21) Appl. No.: 14/131,389

(22) PCT Filed: Jan. 31, 2012

(86) PCT No.: PCT/JP2012/052120
§ 371 (c)(1),
(2), (4) Date: Jan. 7, 2014

(87) PCT Pub. No.: WO2013/021665
PCT Pub. Date: Feb. 14, 2013

(65) Prior Publication Data
US 2014/0148103 A1  May 29, 2014

(30) Foreign Application Priority Data
Aug. 11, 2011  (JP) .................................. 2011-176147

(51) Int. Cl.
*H04B 1/38* (2015.01)
*H01Q 11/12* (2006.01)
(Continued)

(52) U.S. Cl.
CPC ................. *H04W 24/10* (2013.01); *H04Q 9/00* (2013.01); *H04W 52/0258* (2013.01); *H04W 52/0277* (2013.01)

(58) Field of Classification Search
USPC .................... 455/572, 573, 574, 127.1, 127.5; 340/539.1; 320/107, 114
See application file for complete search history.

(56) References Cited

U.S. PATENT DOCUMENTS

2005/0099289 A1* 5/2005 Arita et al. ................. 340/539.1
2005/0231770 A1  10/2005 Seo
(Continued)

FOREIGN PATENT DOCUMENTS

CN         1683165 A    10/2005
CN       102017527 A     4/2011
(Continued)

OTHER PUBLICATIONS

International Preliminary Report on Patentability issued in corresponding WIPO Application No. PCT/JP2012/052120, mailed Feb. 20, 2014 (6 pages).
(Continued)

*Primary Examiner* — Nguyen Vo
(74) *Attorney, Agent, or Firm* — Osha Liang LLP

(57) ABSTRACT

A wireless sensor module has a sensor that measures a measuring object to generate measured data, a wireless communication section that wirelessly transmits the measured data to an external device and receives a radio signal from the external device, a control section that controls the sensor and the wireless communication section, and an electric power storage device that serves as an electric power supply. The control section secures an idle period of time in a series of operations for processing the measured data so that the series of operations are not carried out consecutively. The series of operations includes an operation in which the sensor generates the measured data, and an operation in which the wireless communication section wirelessly transmits the measured data to the external device.

6 Claims, 6 Drawing Sheets

(51) Int. Cl.
  *H04B 1/04* (2006.01)
  *H04W 24/10* (2009.01)
  *H04Q 9/00* (2006.01)
  *H04W 52/02* (2009.01)

(56) References Cited

U.S. PATENT DOCUMENTS

2008/0027586 A1* 1/2008 Hern et al. .................. 700/284
2009/0310571 A1 12/2009 Matischek et al.
2010/0317379 A1* 12/2010 Gupta ........................ 455/466
2011/0004445 A1* 1/2011 Borlee ........................ 702/187
2011/0074225 A1 3/2011 Delnoij et al.
2011/0148349 A1* 6/2011 Kim et al. .................. 320/108
2011/0194471 A1 8/2011 Kim et al.

FOREIGN PATENT DOCUMENTS

CN 102057756 A 5/2011
JP 61-210729 A 9/1986
JP 11-168395 A 6/1999
JP 2006-340157 A 12/2006
JP 2009-216433 A 9/2009

OTHER PUBLICATIONS

Chinese Office Action for Application No. 201280033768.8, mailed on Sep. 3, 2014 (15 pages).
International Search Report issued in PCT/JP2012/052120 mailed on Apr. 3, 2012 (3 pages).
Written Opinion of the International Searching Authority issued in PCT/JP2012/052120 mailed on Apr. 3, 2012 (3 pages).
Extended European search report issued in corresponding European Application No. 12822864.0, mailed on Jan. 23, 2015 (7 pages).

* cited by examiner

| Operation | Outline Of Operation | Electric Current (mA) | Time (ms) |
|---|---|---|---|
| B1 | Participation In Network | 5 | 3 |
| B2 | Communication Of Acceleration Sensor | 8.9 | 40 |
| B3 | Wireless Communication Of Data | 7.8 | 12.3 |
| B4 | Reception Of ACK | 13.3 | ≦1 |

WIRELESS SENSOR MODULE, METHOD FOR PROCESSING MEASUREMENT DATA THEREBY, AND RECORDING MEDIUM

BACKGROUND

1. Technical Field

The present invention relates to (i) a wireless sensor module including a sensor, (ii) how the wireless sensor module processes measured data, (iii) a program and (iv) a recording medium.

2. Related Art

Conventionally, known is a wireless sensor module which transmits, as a radio signal to a server, measured data generated by a sensor. According to a system including such a wireless sensor module, for example, (i) wireless sensor modules are provided for respective target devices to be measured, and (ii) a server monitors each state of the target devices from pieces of measured data which are wirelessly transmitted from the respective wireless sensor modules.

Normally, the wireless sensor modules measure the respective target devices for a long period of time. Further, each of the wireless sensor modules is small in size and light in weight, and accordingly includes a small-capacity electric power supply section. Required is a wireless sensor module capable of operating stably for a long period of time with such a small-capacity electric power supply section.

For example, Patent Literature 1 discloses a configuration in which (i) a sensor detects a state of a target device to be measured, (ii) whether a predetermined change has occurred or not is determined from a result obtained by detecting the state, and (iii) in a case where it is determined that such a predetermined change has occurred, a reception section is wirelessly notified that the predetermined change has occurred. According to the configuration, only in a case where a predetermined change has occurred in the state of the target device to be measured, a wireless sensor module wirelessly notifies the reception section that the predetermined change has occurred. It is therefore possible to suppress power consumption of an electric power supply section of the wireless sensor module.

CITATION LIST

Patent Literature

Patent Literature 1
Japanese Patent Application Publication, Tokukai, No. 2006-340157 A (Publication Date: Dec. 14, 2006)

SUMMARY

Conventionally, a wireless sensor module wirelessly transmits measured data to a server by carrying out a series of consecutive operations such as (i) an operation for participating in a network in which the wireless sensor module communicates with a server, (ii) an operation for obtaining measured data from a sensor, (iii) an operation for supplying the measured data to a wireless communication section of the wireless sensor module, (iv) an operation for wirelessly transmitting the measured data to the server via the wireless communication section, and (v) an operation for receiving reception acknowledgement information from the server.

In a case where an electric power supply section of the wireless sensor module has a small capacity, for example, in a case where the wireless sensor module employs capacitors or a small-capacity solid-state battery as an electric power supply section, an output voltage of the electric power supply section is easily decreased by being remarkably affected by (i) an IR drop due to application of a load and/or (ii) a voltage drop due to internal resistance of the capacitors. In a case where a heavy load is applied to the electric power supply section, the output voltage of the electric power supply section becomes less than an operable minimum voltage of the wireless communication section. This causes a defect that the wireless communication section cannot operate. Such a defect cannot be avoided even by the configuration disclosed by Patent Literature 1.

Note that, conventionally, in a case where capacitors are employed as an electric power supply section, the capacitors are connected in parallel to each other so that a combined internal resistance is decreased. This prevents a voltage of the electric power supply section from being decreased. For example, an allowable resistance, which causes a voltage drop due to electric discharge, is calculated on the basis of a direct current resistance per one (1) capacitor. In a case where the voltage drop is large, the combined internal resistance is decreased by increasing the number of capacitors to be connected in parallel, so that quantity of the voltage drop is decreased. However, such an increase in the number of capacitors may cause (i) a rise in manufacturing cost, (ii) an increase in leak current, and (iii) an increase in size of a wireless sensor module.

One or more embodiments of the present invention provides (i) a wireless sensor module capable of preventing an output voltage of an electric power supply section of the wireless sensor module from becoming less than an operable minimum voltage of the wireless sensor module, even in a case where the wireless sensor module carries out a series of operations for transmitting measured data, (ii) how the wireless sensor module processes the measured data, (iii) a program, and (iv) a recording medium.

According to one or more embodiments of the present invention, a wireless sensor module includes: a sensor for making a measurement with respect to a measuring object so as to generate measured data; a wireless communication section for (i) wirelessly transmitting the measured data to an external device and (ii) receiving a radio signal from the external device; a control section for controlling the sensor and the wireless communication section; and an electric power storage device which serves as an electric power supply, the control section securing an idle period(s) of time in a series of operations for processing the measured data so that the series of operations are not carried out consecutively, the series of operations including (i) an operation in which the sensor generates the measured data and (ii) an operation in which the wireless communication section wirelessly transmits the measured data to the external device.

A method of processing measured data by use of a wireless sensor module according to one or more embodiments of the present invention processes measured data by use of a wireless sensor module, the wireless sensor module, including: a sensor for making a measurement with respect to a measuring object so as to generate measured data; a wireless communication section for (i) wirelessly transmitting the measured data to an external device and (ii) receiving a radio signal from the external device; and an electric power storage device which serves as an electric power supply, the method including the step of: securing an idle period(s) of time in a series of operations for processing the measured data so that the series of operations are not carried out consecutively, the series of operations including (i) an operation in which the sensor generates the measured data and (ii) an operation in which the wireless communication section wirelessly transmits the measured data to the external device.

According to one or more embodiments of the present invention, an idle period(s) of time is secured in a series of operations for processing measured data so that the series of operations are not carried out consecutively. It is therefore possible to restore, during the idle period(s) of time, a voltage drop in an output voltage of an electric power storage device. With the configuration, even in a case where a relatively small-capacity electric power storage device is employed as an electric power supply, it is possible to prevent the output voltage from becoming less than an operable minimum voltage of a wireless sensor module. This ultimately prevents the wireless sensor module from stopping operating.

In a case where the electric power storage device is constituted by capacitors, it is possible to restore, during an idle period of time, a voltage drop caused by internal resistance of the capacitors in the output voltage of the electric power storage device. This eliminates the necessity of increasing, in consideration of a reduction in the internal resistance of the capacitors, the number of capacitors serving as the electric power storage device in the wireless sensor module. The number of capacitors can be reduced. This ultimately allows a reduction in size of the wireless sensor module.

In a case where a capacitor is used for a long period of time, there occurs an increase in resistance of the capacitor normally due to application of a voltage to the capacitor. This causes a reduction in restored voltage after no load is applied to the capacitor. This ultimately causes the capacitor to have a shorter life duration. On the contrary, by securing an idle period(s) of time in a series of operations for processing measured data, it is possible to alleviate such a reduction in the restored voltage during the series of operations. This ultimately allows the capacitor to have a longer life duration.

DETAILED DESCRIPTION

Figure 1:
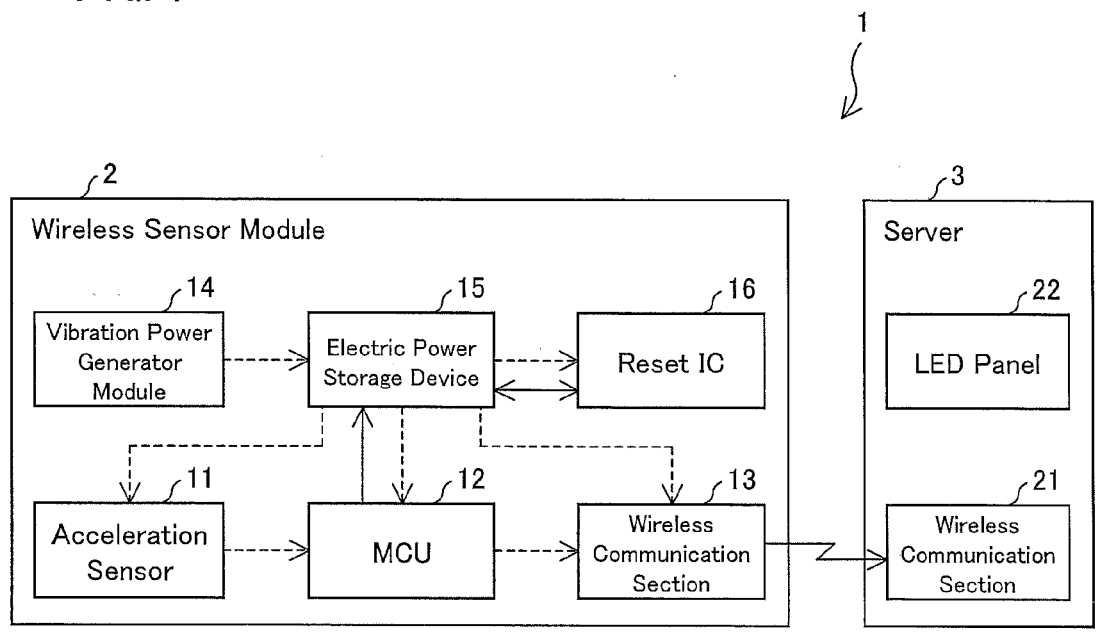
FIG. 1 is a block diagram illustrating how a monitoring system is configured, the monitoring system including a wireless sensor module according to one or more embodiments of the present invention.

The following description will discuss embodiments of the present invention with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a block diagram illustrating how a monitoring system 1 is configured, the monitoring system 1 including a wireless sensor module 2 according to one or more embodiments of the present invention. Note that, in FIG. 1, solid lines each represent a signal line, and dash lines each represent an electric power line.

As illustrated in FIG. 1, the monitoring system 1 includes the wireless sensor module 2 and a server 3 (external device). The wireless sensor module 2 is configured to (i) cause a sensor to measure a state of a measuring object and (ii) wirelessly transmit, to the server 3, measured data indicative of a measured result. The sever 3 is configured to monitor the state of the measuring object on the basis of the measured data received from the wireless sensor module 2.

Figure 2:
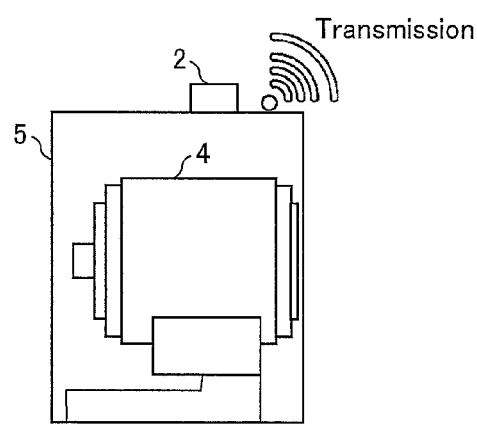
FIG. 2 is an explanatory view illustrating how the wireless sensor module, illustrated by FIG. 1, is located with respect to a measuring object.

According to one or more embodiments of the present invention, as illustrated in FIG. 2, the wireless sensor module 2 is provided on a motor 4 serving as measuring object. More specifically, the wireless sensor module 2 is provided on a housing 5 which encloses the motor 4. FIG. 2 is an explanatory view illustrating how the wireless sensor module 2 is located with respect to the measuring object. The wireless sensor module 2 measures vibrations of the motor 4, and then transmits measured data on the vibrations to the server 3. The sever 3 determines a state of the motor 4 on the basis of the measured data received from the wireless sensor module 2. For example, the server 3 determines whether or not there is a change, in vibration frequency of the motor 4, indicated by the measured data. Then, the server 3 determines, based on such a change, whether or not the motor 4 is deteriorated, that is, whether or not the motor 4 should be replaced with a new one.

The wireless sensor module 2 includes (i) an acceleration sensor 11, (ii) a micro controller unit (hereinafter referred to simply as an MCU) 12 which serves as a control section, (iii) a wireless communication section 13, (iv) a vibration power generator module 14, (v) an electric power storage device 15, and (vi) a reset IC 16 (see FIG. 1).

The acceleration sensor 11 detects vibrations of the motor 4, and supplies measured data to the MCU 12. The MCU 12 controls operations of the components of the wireless sensor module 2. The MCU 12 receives the measured data from the acceleration sensor 11, and then transmits the measured data to the server 3, via the wireless communication section 13.

The vibration power generator module 14 generates electric power in response to the vibrations of the motor 4, and then supplies the electric power to the electric power storage device 15. The electric power storage device 15 stores therein the electric power supplied from the vibration power generator module 14. The electric power storage device 15 is controlled by the reset IC 16 to discharge electric power. The electric power discharged by the electric power storage device 15 is supplied, as needed, to the acceleration sensor 11, the MCU 12, the wireless communication section 13, and the reset IC 16.

According to one or more embodiments of the present invention, the electric power storage device 15 is constituted by, for example, a plurality of capacitors which are connected in series-parallel. For example, electric double layer capacitors are employed as the capacitors. Note that the electric power storage device 15 is not limited to being constituted by the capacitors and can alternatively be constituted by a solid-state battery or a lithium ion secondary battery.

The reset IC 16 monitors an output voltage of the electric power storage device 15. When the output voltage of the electric power storage device 15 becomes not less than a threshold voltage, the reset IC 16 controls the electric power storage device 15 to supply electric power to the MCU 12, that is, to discharge.

The server 3 includes a wireless communication section 21 and an LED panel 22 which serves as a display section. The wireless communication section 21 establishes a wireless communication with the wireless communication section 13 of the wireless sensor module 2 so as to receive measured data from the wireless communication section 13. The LED panel 22 displays various pieces of information thereon, as needed.

Figure 3:
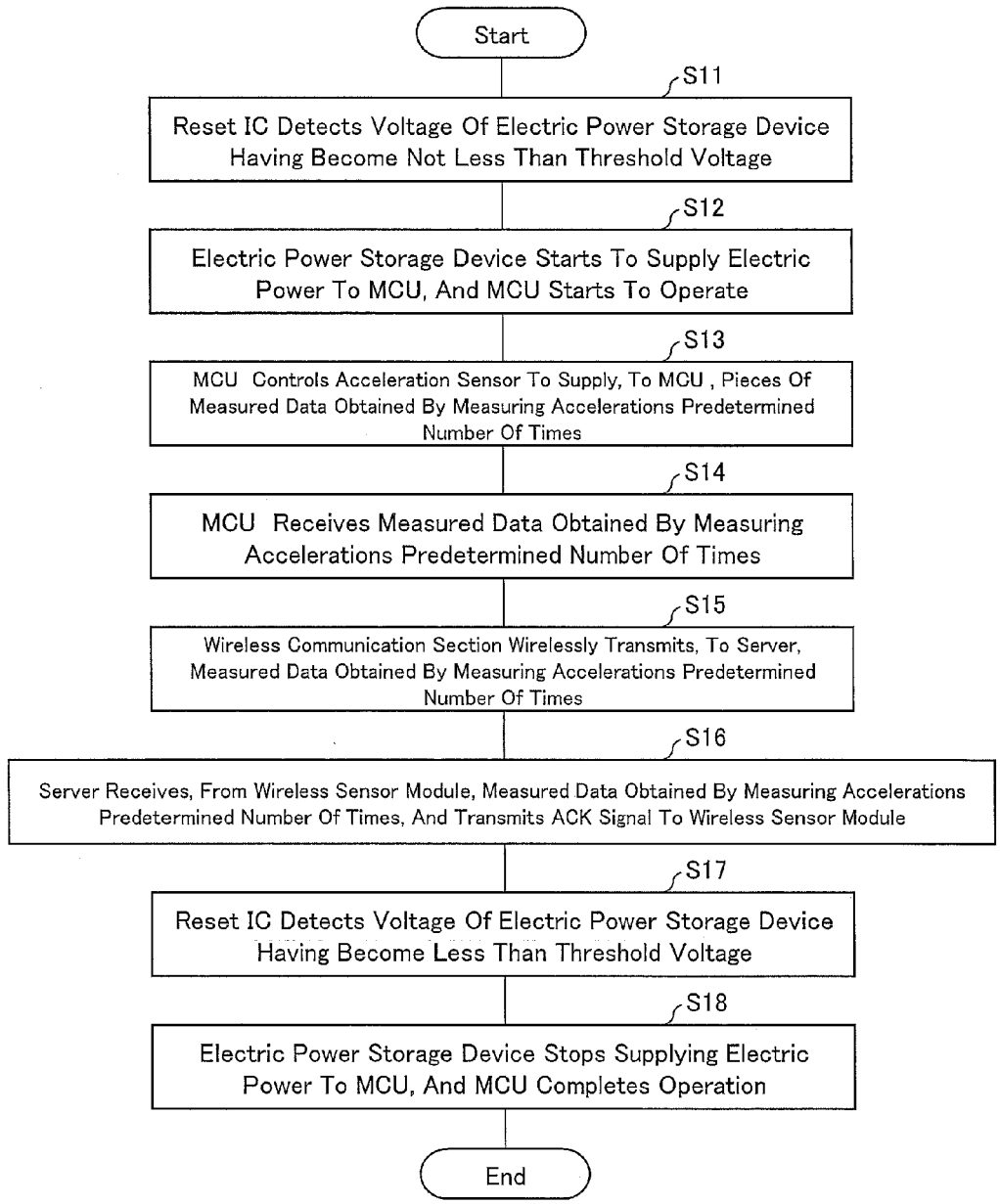
FIG. 3 is a flowchart illustrating how the monitoring system, illustrated in FIG. 1, operates.

The following description will discuss how the monitoring system 1 operates in the above configuration. FIG. 3 is a flowchart illustrating how the monitoring system 1, illustrated in FIG. 1, operates. In the monitoring system 1, the following operations (A1) through (A7) are carried out in this order.

(A1) In the wireless sensor module 2, when the reset IC 16 detects the output voltage of the electric power storage device 15 having become not less than a threshold voltage (S11), the reset IC 16 controls the electric power storage device 15 to supply electric power to the MCU 12 (S12).

(A2) Upon reception of the electric power from the electric power storage device 15, the MCU 12 starts to operate (S12).

(A3) The MCU 12 controls the acceleration sensor 11 to (i) measure accelerations predetermined number of times (for example, 128 times) and (ii) supply, to the MCU 12, pieces of measured data obtained by measuring the accelerations the predetermined number of times (S13).

(A4) The MCU 12 receives the pieces of measured data from the acceleration sensor 11, and then confirms that the MCU 12 has received the pieces of measured data obtained by measuring the accelerations (S14).

(A5) The MCU 12 controls the wireless communication section 13 to wirelessly transmit, to the server 3, the above pieces of measured data (S15).

(A6) Upon reception of the above pieces of measured data from the wireless communication section 13, the wireless communication section 21 of the server 3 wirelessly transmits, to the wireless sensor module 2, an ACK signal indicating that the above pieces of measured data have been received (S16). The ACK signal is then received by the wireless communication section 13.

(A7) When the reset IC 16 detects the output voltage of the electric power storage device 15 having become less than the threshold voltage, the reset IC 16 controls the electric power storage device 15 to stop supplying electric power to the MCU 12 (S17). This causes the MCU 12 to stop operating (S18).

Note that the operations (A2) through (A6), that is, the steps S12 through S16, are carried out while the MCU 12 is in the starting operation, during which the MCU 12 is consuming the electric power of the electric power storage device 15. Therefore, as the MCU 12 operates for a longer period of time, the output voltage of the electric power storage device 15 is decreased so as to become less than the threshold voltage.

Note also that timing, at which the MCU 12, that is, the wireless sensor module 2 stops operating, is not limited to the timing when the output voltage of the electric power storage device 15 has become less than the threshold voltage. Alternatively, the wireless sensor module 2 can stop operating when the wireless communication section 13 has received the ACK signal from the server 3, that is, when a series of operations for transmitting, to the server 3, measured data detected by the acceleration sensor 11 are completed.

The following description will discuss in detail how the wireless sensor module 2 operates in a case of transmitting, to the server 3, measured data detected by the acceleration sensor 11.

The wireless sensor module 2 carries out the following series of operations (B1) through (B4) in a case of transmitting, to the server 3, the measured data detected by the acceleration sensor 11. The series of operations (B1) through (B4) are carried out under control of the MCU 12 by the wireless sensor module 2 in a case of processing the measured data. Note that the series of operations (B1) through (B4) are carried out in this order.

(B1) Participation in Network

An operation for participating in a wireless network so that the wireless sensor module 2 communicates with the server 3

(B2) Communication of Acceleration Sensor

An operation for (i) causing the acceleration sensor 11 to measure accelerations predetermined number of times and (ii) obtaining, from the acceleration sensor 11, pieces of measured data obtained by measuring the accelerations the predetermined number of times (B3) Wireless Transmission of Data An operation for supplying the pieces of measured data to the wireless communication section 13 and an operation for causing the wireless communication section 13 to wirelessly transmit the pieces of measured data to the server 3

(B4) Reception of ACK

Figures 4, 5:
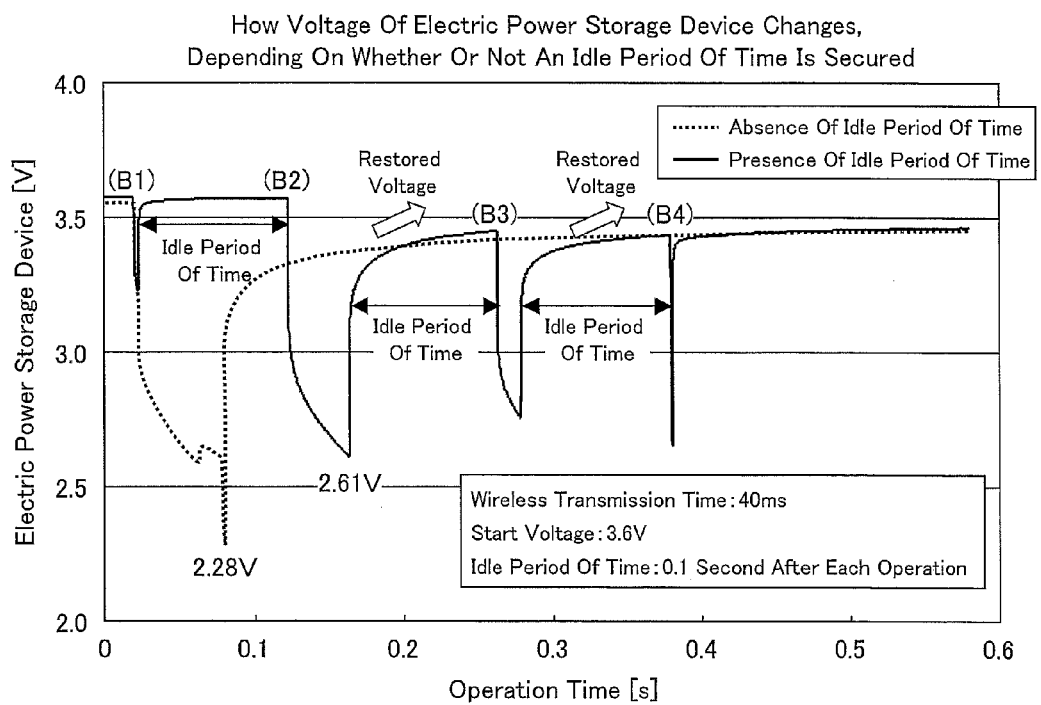
FIG. 4 is an explanatory view illustrating a consumption electric current and an operation time which are required for each operation of a series of operations which are carried out by the wireless sensor module in a case of transmitting, to a server, measured data detected by an acceleration sensor illustrated in FIG. 1.
FIG. 5 is a graph illustrating how an output voltage of an electric power storage device changes, depending on whether or not an idle period(s) of time is secured in the series of operations in the wireless sensor module illustrated in FIG. 1.

An operation for receiving, from the server 3, an acknowledgement signal which indicates that the server 3 has received the measured data FIG. 4 illustrates a consumption electric current and an operation time which are required for each of the operations (B1) through (B4). Specifically, FIG. 4 is an explanatory view describing a consumption electric current and an operation time which are required for each of the series of operations, which are carried out by the wireless sensor module 2, for transmitting, to the server 3, pieces of measured data detected by the acceleration sensor 11. Note that (i), for example, a Gazell module (product number: RFS24N1D-10), manufactured by OMRON Corporation, is employed as the wireless sensor module 2, (ii) the electric currents (electric current consumption) in FIG. 4 are the ones listed in a product specification of the Gazell module, and (iii) the times (operation times) in FIG. 4 are respective theoretical times.

Note here that the wireless sensor module 2 does not consecutively carry out the series of operations (B1) through (B4) but an idle period of time (interval) is secured between respective adjacent operations. According to one or more embodiments of the present invention, the idle period of time is set to 0.1 second. Note also that even during the idle period of time, the electric power storage device 15 supplies standby electric power to at least the MCU 12.

The following description will discuss how an output voltage of the electric power storage device 15 is restored in a case where the idle period of time is secured in the series of operations which are carried out by the wireless sensor module 2 so as to transmit, to the server 3, the pieces of measured data detected by the acceleration sensor 11. FIG. 5 is a graph illustrating how the output voltage of the electric power storage device 15 changes, depending on whether or not the idle period of time is secured in the series of operations in the wireless sensor module 2.

In FIG. 5, a solid line represents how the output voltage of the electric power storage device 15 changes in a case where an idle period of time is secured between respective adjacent operations of the series of operations. In FIG. 5, a dash line represents how the output voltage of the electric power storage device 15 changes in a case where the series of operations are consecutively carried out without any idle period of time.

As is clear from the dash line in FIG. 5, in the case where the series of operations are consecutively carried out without any idle period of time, the output voltage of the electric power storage device 15, which was initially 3.6 V, is reduced to 2.28 V. Under the circumstances, the wireless sensor module 2 stops operating during the series of operations, when an operable minimum voltage of any of the devices/means (hereinafter referred to simply as an operable minimum voltage of the wireless sensor module 2), included in the wireless sensor module 2, is larger than 2.28 V (for example, 2.5 V).

On the contrary, in a case where an idle period of time is secured (i) between the operation (B1) and the operation (B2), (ii) between the operation (B2) and the operation (B3), and (iii) between the operation (B3) and the operation (B4), the output voltage of the electric power storage device 15 increases from a lowest voltage after each of the series of the operations. The output voltage is thus restored during each of the idle periods of time. It follows that, during the series of operations, the output voltage of the electric power storage device 15 will never become less than the operable minimum voltage (for example, 2.5 V) of the wireless sensor module 2. It is therefore possible to prevent the wireless sensor module 2 from stopping operating during the series of operations.

Figure 6:
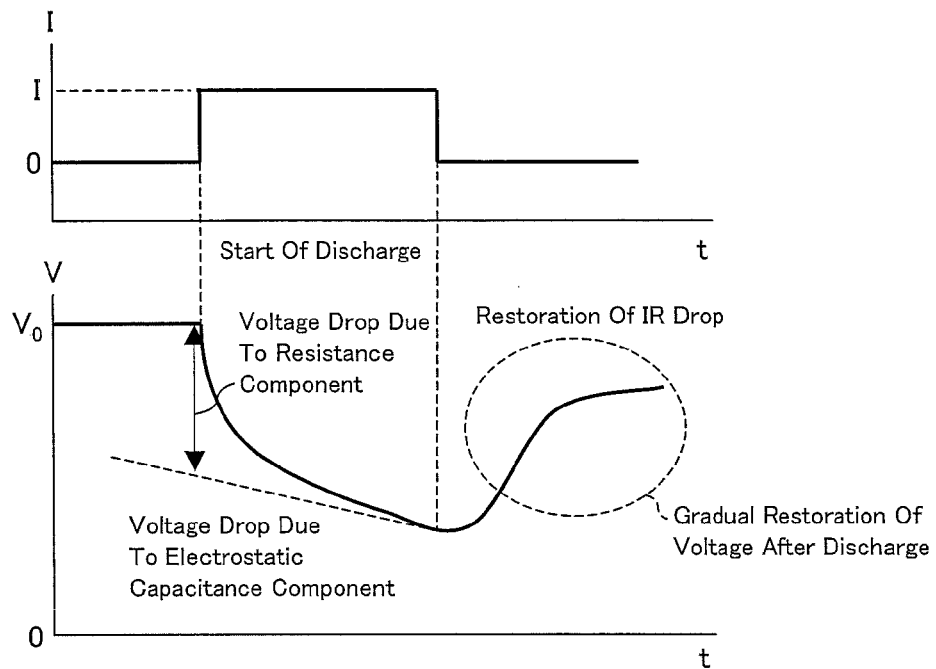
FIG. 6 is a graph illustrating (i) how the output voltage of the electric power storage device is decreased due to electric discharge of the electric power storage device illustrated in FIG. 1 and (ii) how the output voltage is increased after the electric discharge.
Figure 7:
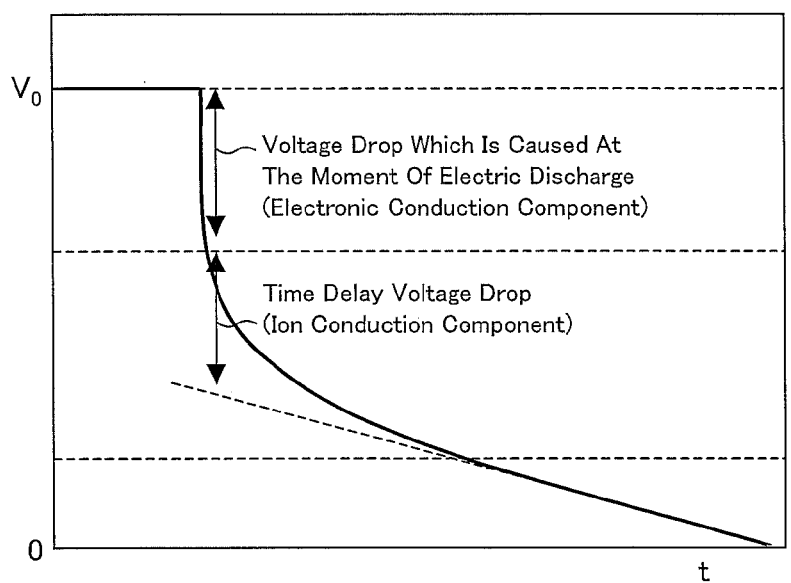
FIG. 7 is an enlarged graph illustrating how the output voltage of the electric power storage device is decreased due to electric discharge of the electric power storage device (see FIG. 6).

The following description will discuss a principle which allows the output voltage of the electric power storage device 15 to be restored during each of the idle periods of time periods which are secured in the series of operations. FIG. 6 is a graph illustrating (i) how the output voltage of the electric power storage device 15 is decreased due to electric discharge of the electric power storage device 15 and (ii) how the output voltage is increased after the electric discharge. FIG. 7 is an enlarged graph illustrating how the output voltage of the electric power storage device 15 is decreased due to electric discharge of the electric power storage device 15 (see FIG. 6).

Immediately after the electric power storage device 15 starts to discharge electric power, the output voltage of the electric power storage device 15 is decreased due to so-called IR drop (see FIG. 6). Note that the IR drop is made up of (i) voltage drop which is caused at the moment of the electric discharge (electronic conduction component) and (ii) time delay voltage drop (ion conduction component).

When the electric power storage device 15 stops electric discharge, the voltage drop, caused by IR drop in the output voltage of the electric power storage device 15, is gradually restored. The output voltage of the electric power storage device 15 can be thus restored during each of the idle periods of time which are secured in the series of operations.

Figure 8:
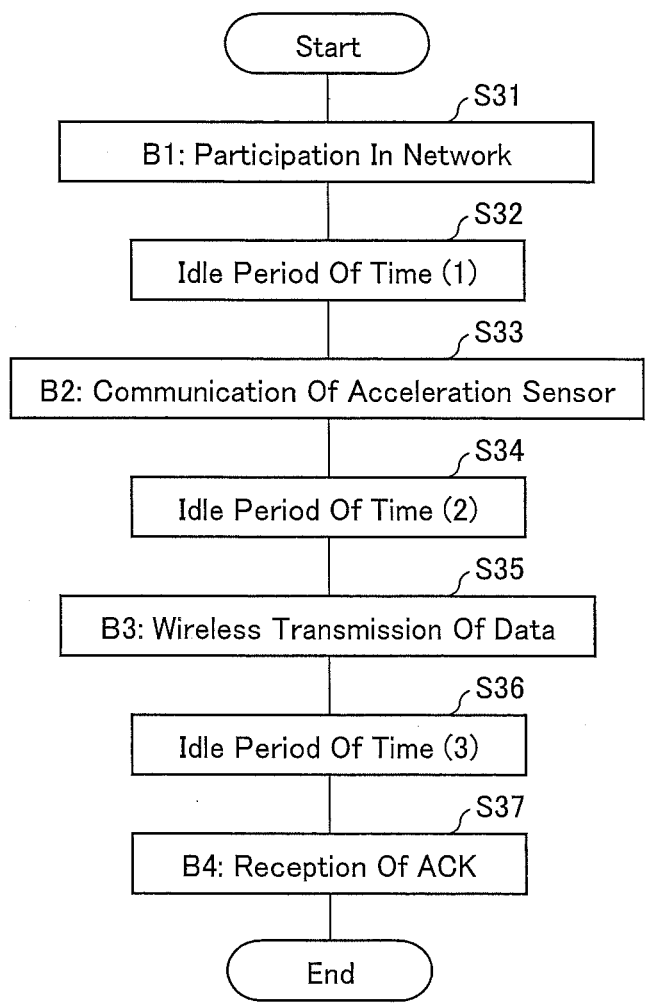
FIG. 8 is a flowchart illustrating the series of operations which are carried out by the wireless sensor module in a case of transmitting, to the server, the measured data detected by the acceleration sensor illustrated in FIG. 1.

The following description will discuss, with reference to a flowchart, how the wireless sensor module 2 operates in a case where measured data, detected by the acceleration sensor 11, is transmitted to the server 3. FIG. 8 is a flowchart illustrating how the wireless sensor module 2 operates in a case where measured data, detected by the acceleration sensor 11, is transmitted to the server. Note that the MCU 12 controls operations illustrated in FIG. 8. Note also that the operations, illustrated in FIG. 8, correspond to those of S13 through S16 (see FIG. 3) which are carried out in the monitoring system 1.

Before the measured data detected by the acceleration sensor 11 is transmitted to the server 3, an operation, for participating in the wireless network in which the wireless sensor module 2 communicates with the server 3 via the wireless communication section 13, is carried out (S31). The step S31 is followed by an idle period of time (1) of 0.1 second (S32).

After S32, in the wireless sensor module 2, the acceleration sensor 11 make measurements predetermined number of times (for example, 128 times), and the MCU 12 acquires, from the acceleration sensor 11, pieces of measured data obtained by making the measurements the predetermined number of times (S33). The step S33 is followed by an idle period of time (2) of 0.1 second (S34).

After S34, in the wireless sensor module 2, the MCU 12 supplies the pieces of measured data to the wireless communication section 13, and then the pieces of measured data are wirelessly transmitted to the server 3 via the wireless communication section 13 (S35). The step S35 is followed by an idle period of time (3) of 0.1 second (S36).

After S36, the wireless sensor module 2 receives, from the server 3, an acknowledgement signal which indicates that the server 3 has received the pieces of measured data. This completes the above-described series of operations.

According to the wireless sensor module 2 of one or more embodiments of the present invention, the idle periods of time are secured in the series of operations for processing the pieces of measured data detected by the acceleration sensor 11. This prevents the output voltage of the electric power storage device 15 from becoming less than the operable minimum voltage of the wireless sensor module 2. It is therefore possible to prevent the wireless sensor module 2 from stopping operating. In consequence, even in a case where the electric power storage device 15, which serves as an electric power supply section, has a small capacity, the wireless sensor module 2 can operate stably for a long period of time.

In a case where the electric power storage device 15 is constituted by capacitors, it is possible to restore the voltage drop caused by internal resistance of the capacitors in the output voltage of the electric power storage device 15, by securing idle periods of time in the series of operations. This eliminates the necessity of increasing, in consideration of a reduction in the internal resistance of the capacitors, the number of capacitors serving as the electric power storage device 15 in the wireless sensor module 2. The number of capacitors can be reduced. This ultimately allows a reduction in size of the wireless sensor module 2.

In a case where a capacitor is used for a long period of time, there occurs an increase in resistance of the capacitor normally due to application of a voltage to the capacitor. This causes a reduction in restored voltage after no load is applied to the capacitor. This ultimately causes the capacitor to have a shorter life duration. On the contrary, by securing idle periods of time in the series of operations, it is possible to alleviate such a reduction in the restored voltage during the series of operations. This ultimately allows the capacitor to have a longer life duration.

Note that, in terms of the fact that the output voltage of the electric power storage device 15 can be restored during the idle periods of time, according to one or more embodiments of the present invention, an idle period of time is secured between respective adjacent operations in a series of operations of the wireless sensor module 2, if no problem is caused by securing such an idle period of time between the respective adjacent operations of the series of operations.

Note also that it is effective to secure an idle period of time particularly after an operation in which a relatively large electric current (electric power) is consumed, in view of the fact that the output voltage of the electric power storage device 15, which output voltage has been remarkably reduced due to such an operation, can be restored during the idle period of time. Note that the operation, in which a relatively large electric current is consumed, is an operation which causes the electric power storage device 15 to have a heavy load. This is because a load (electric charge) is calculated by multiplying an electric current consumption (discharge electric current) by a discharge time.

Moreover, it is effective to secure an idle period of time before an operation in which a relatively large electric current (electric power) is consumed, in view of the fact that it is possible to increase in advance the output voltage of the electric power storage device 15, which output voltage is predicted to be remarkably reduced due to the operation.

It is not essential that an idle period of time be secured in respective adjacent operations of a series of operations. For example, in a case where the output voltage of the electric power storage device 15 does not become less than the operable minimum voltage of the wireless sensor module 2 even during a first operation and a second operation which are being consecutively carried out, the first and second operations can be carried out consecutively without any idle period of time between the first and second operations. That is, an idle period of time merely needs to be secured at least between two adjacent operations of a series of a plurality of operations.

The length of an idle period of time can be set as appropriate, by taking into consideration (i) a voltage restoring property of the electric power storage device 15 during the idle period of time, (ii) the capacity of the electric power storage device 15, and (iii) power consumption of the MCU 12 during the idle period of time during which the MCU 12 is on standby. Specifically, the idle period of time merely needs to have a length which allows an increase in the output voltage of the electric power storage device 15, which output voltage has been reduced due to application of a load to the electric power storage device 15. Note that, in a case where an idle period of time is too long, the output voltage of the electric power storage device 15 will become less than the operable minimum voltage of the wireless sensor module 2 due to power consumption of the MCU 12 which is waiting. It is therefore necessary to set the length of the idle period of time so that the output voltage of the electric power storage device 15 does not become less than the operable minimum voltage of the wireless sensor module 2 due to the power consumption of the MCU 12 which is waiting.

Figure 9:
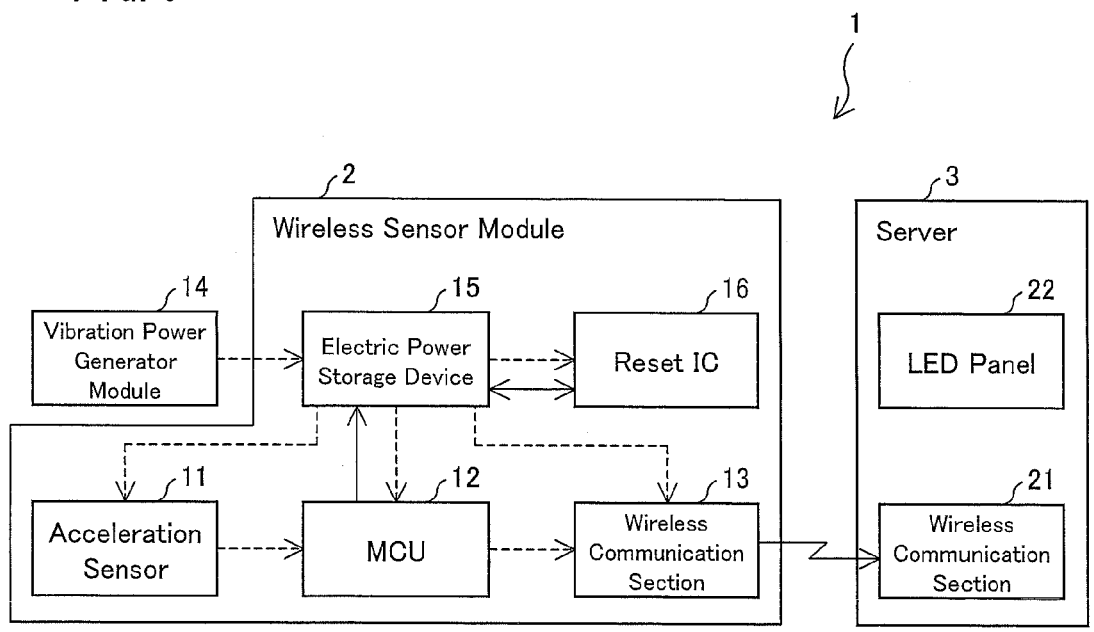
FIG. 9 is a block diagram illustrating a monitoring system which includes a wireless sensor module which is different in configuration from the wireless sensor module illustrated in FIG. 1.

According to one or more embodiments of the present invention, the wireless sensor module 2 is configured to include the vibration power generator module 14 as a power generator module (see FIG. 1). However, the wireless sensor module 2 is not limited to the configuration. The wireless sensor module 2 can alternatively be configured to include no power generator module (such as the vibration power generator module 14), as illustrated in FIG. 9. FIG. 9 is a block diagram illustrating a monitoring system 1 which includes a wireless sensor module 2 which is different in configuration from the wireless sensor module 2 illustrated in FIG. 1.

One or more embodiments of the present invention is effective in so-called energy harvesting which efficiently utilizes a limited energy, such as utilizing electric power which is (i) generated by a vibration power generator and (ii) stored in the electric power storage device 15.

Similar to the wireless sensor module 2 of one or more embodiments of the present invention, typical household electrical appliances and mobile devices, none of which employ the energy harvesting, cause a remarkable decrease in voltage of an electric power storage device that is constituted by capacitors, in a case where the typical household electrical appliances and mobile devices carry out an operation, such as wireless transmission, which consumes high electric power. However, the voltage is immediately restored because the typical household electrical appliances and mobile devices receive an abundant energy from a large-capacity electric power supply such as a commercial electric power supply or a lithium ion secondary battery. Therefore, a technique of restoring the output voltage of the electric power storage device during an idle period of time which is secured in a series of operations is relatively less effective in the typical household electrical appliances and mobile devices. On the contrary, the technique is relatively more effective in the energy harvesting which efficiently utilizes a limited energy.

Note that an environmental energy source is not limited to vibration energy. Examples of the environmental energy source include heat, electromagnetic wave, and light (sunlight).

Note also that a target to be measured by a sensor is not limited to vibration. Examples of the target include (i) physical targets such as temperature, moisture, illuminance, flow, pressure, earth temperature, and particle, and (ii) chemical targets such as $CO_2$, pH, EC, and soil moisture.

The MCU 12 (control section) of the wireless sensor module 2 can be constituted by hardware logic. Alternatively, the MCU 12 (control section) of the wireless sensor module 2 can be realized by software with the use of a CPU as follows.

The MCU 12 includes a CPU (central processing unit), a ROM (read only memory), a RAM (random access memory), and a memory device (recording medium) such as a memory. The CPU executes instructions in a control program for realizing each function. The ROM contains the control program, the control program is loaded on the RAM, and the memory device stores the control program and various data. According to one or more embodiments of the present invention, a computer-readable recording medium is connected to the MCU 12, storing control program codes (executable program, intermediate code program, or source program) for the MCU 12, serving as software for realizing the foregoing respective functions, so that the computer (or CPU or MPU) retrieves and executes the control program codes stored in the computer-readable recording medium.

The computer-readable recording medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM (Registered Trademark), or flash ROM.

Alternatively, the MCU 12 can be arranged to be connectable to a communications network so that the control program codes are delivered over the communications network. The communications network is not limited to a specific one, and can therefore be, for example, the Internet, an intranet, extranet, LAN, ISDN, VAN, CATV communications network, virtual dedicated network (virtual private network), telephone line network, mobile communications network, or satellite communications network. A transfer medium which constitutes the communications network is not limited to a specific one, and can therefore be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. One or more embodiments of the present invention encompasses a carrier wave, in which computer data signal which is embodied by electronic transmission of the control program codes, is embedded.

A wireless sensor module according to one or more embodiments of the present invention is configured to include: a sensor for making a measurement with respect to a measuring object so as to generate measured data; a wireless communication section for (i) wirelessly transmitting the measured data to an external device and (ii) receiving a radio signal from the external device; a control section for controlling the sensor and the wireless communication section; and an electric power storage device which serves as an electric power supply, the control section securing an idle period(s) of time in a series of operations for processing the measured data so that the series of operations are not carried out consecutively, the series of operations including (i) an operation in which the sensor generates the measured data and (ii) an operation in which the wireless communication section wirelessly transmits the measured data to the external device.

A method, according to one or more embodiments of the present invention, of processing measured data by use of a wireless sensor module is configured to be a method of processing measured data by use of a wireless sensor module, the wireless sensor module, including: a sensor for making a measurement with respect to a measuring object so as to generate measured data; a wireless communication section for (i) wirelessly transmitting the measured data to an external device and (ii) receiving a radio signal from the external device; and an electric power storage device which serves as an electric power supply, the method including the step of: securing an idle period(s) of time in a series of operations for processing the measured data so that the series of operations are not carried out consecutively, the series of operations including (i) an operation in which the sensor generates the measured data and (ii) an operation in which the wireless communication section wirelessly transmits the measured data to the external device.

A program according to one or more embodiments of the present invention is configured to be a program for causing a computer to control a wireless sensor module, the wireless sensor module, including: a sensor for making a measurement with respect to a measuring object so as to generate measured data; a wireless communication section for (i) wirelessly transmitting the measured data to an external device and (ii) receiving a radio signal from the external device; and an electric power storage device which serves as an electric power supply, the program causing the computer to carry out control in which an idle period(s) of time is secured in a series of operations for processing the measured data so that the series of operations are not carried out consecutively, the series of operations including (i) an operation in which the sensor generates the measured data and (ii) an operation in which the wireless communication section wirelessly transmits the measured data to the external device.

According to the configuration, in a case where any one of a series of operations for processing measured data is carried out, the electric power storage device supplies electric power. This causes a voltage drop in an output voltage of the electric power storage device. Such a voltage drop is made up of (i) a voltage drop caused by so-called IR drop and (ii) a voltage drop caused by power consumption. Note that the voltage drop caused by the IR drop can be expressed as an ohmic IR drop or a voltage drop due to a resistance component. Note also that the voltage drop caused by power consumption can be expressed as faradaic voltage drop or a voltage drop due to an electrostatic capacitance component.

In a case where a series of operations for processing measured data is carried out consecutively, the output voltage of the electric power storage device is remarkably reduced. This will probably cause the output voltage of the electric power storage device to become less than an operable minimum voltage of any of means included in the wireless sensor module (operable minimum voltage of the wireless sensor module). In a case where the output voltage of the electric power storage device has become less than the operable minimum voltage of the wireless sensor module, the wireless sensor module stops operating during the series of operations. In order to prevent the output voltage of the electric power storage device from becoming less than the operable minimum voltage of the wireless sensor module, a large-capacity electric power storage device should be included in the wireless sensor module. This causes (i) a rise in manufacturing cost of the wireless sensor module and (ii) an increase in size of the wireless sensor module.

On the contrary, according to the configurations of one or more embodiments of the present invention, an idle period(s) of time is secured in a series of operations for processing measured data so that the series of operations are not carried out consecutively. It is therefore possible to restore, during the idle period(s) of time, a voltage drop in an output voltage of the electric power storage device. With the configuration, even in a case where a relatively small-capacity electric power storage device is employed as an electric power supply, it is possible to prevent the output voltage of the electric power storage device from becoming less than the operable minimum voltage of the wireless sensor module. This ultimately prevents the wireless sensor module from stopping operating.

In a case where the electric power storage device is constituted by capacitors, it is possible to restore, during an idle period of time, a voltage drop caused by internal resistance of the capacitors in the output voltage of the electric power storage device. This eliminates the necessity of increasing, in consideration of a reduction in the internal resistance of the capacitors, the number of capacitors serving as the electric power storage device in the wireless sensor module. The number of capacitors can be reduced. This ultimately allows a reduction in size of the wireless sensor module.

In a case where a capacitor is used for a long period of time, there occurs an increase in resistance of the capacitor normally due to application of a voltage to the capacitor. This causes a reduction in restored voltage after no load is applied to the capacitor. This ultimately causes the capacitor to have a shorter life duration. On the contrary, by securing an idle period(s) of time in a series of operations for processing measured data, it is possible to alleviate such a reduction in the restored voltage during the series of operations. This ultimately allows the capacitor to have a longer life duration.

The wireless sensor module according to one or more embodiments of the present invention can be configured such that the idle period of time is secured before or after an operation in which a relatively heavy load is applied to the electric power storage device, the operation being included in the series of operations.

According to the configuration, the idle period of time is secured after the operation in which a relatively heavy load is applied to the electric power storage device. This is effective in view of the fact that the output voltage of the electric power storage device, which output voltage has been remarkably reduced due to the operation, can be restored during the idle period(s) of time.

Further, according to the configuration, the idle period of time is secured before the operation in which a relatively heavy load is applied to the electric power storage device. This is effective in view of the fact that it is possible to increase in advance the output voltage of the electric power storage device, which output voltage is predicted to be remarkably reduced due to the operation.

The wireless sensor module according to one or more embodiments of the present invention can be configured such that the idle period of time is set to have a length which (i) allows an increase in output voltage of the electric power storage device, the output voltage having been reduced due to an operation which (a) is included in the series of operations and (b) has been carried out before the idle period of time and (ii) does not cause the output voltage to become less than an operable minimum voltage of means for carrying out an operation which is included in the series of operations even when the control section, which is on standby, consumes electric power during the idle period of time.

According to the configuration, the idle period of time is set to have the length which allows the increase in the output voltage of the electric power storage device, the output voltage having been reduced due to the operation which (a) is included in the series of operations and (b) has been carried out before the idle period of time. The idle period of time is also set to have the length which does not cause the output voltage to become less than the operable minimum voltage of the means for carrying out the operation which is included in the series of operations even when the control section, which is on standby, consumes electric power during the idle period of time.

It is therefore possible to more appropriately restore, during the idle period of time, the output voltage of the electric power storage device, which output voltage has been reduced due to an operation included in the series of operations. It is also possible to prevent the output voltage of the electric power storage device from becoming less than the operable minimum voltage of the wireless sensor module due to power consumption of the control section during an overly long idle period of time during which the control section is waiting.

The wireless sensor module according to one or more embodiments of the present invention can be configured such that the electric power storage device is constituted by any one of a capacitor, a solid-state battery, and a lithium ion second battery.

According to the configuration, the electric power storage device is constituted by any one of a capacitor, a solid-state battery, and a lithium ion second battery. Particularly, in a case where the electric power storage device is constituted by the capacitor, the electric power storage device can have a relatively small storage capacity, and can be small in size and cheap.

The wireless sensor module according to one or more embodiments of the present invention can be configured to further include a vibration power generator module for (i) generating electric power by means of vibrations and (ii) supplying the electric power to the electric power storage device.

According to the configuration, it is possible to utilize electric power which is (i) generated by the vibration power generator module and (ii) stored in the electric power storage device. That is, it is possible to configure so-called energy harvesting which efficiently utilizes a limited energy.

The present invention is not limited to the description of the embodiments above, and can therefore be modified by a skilled person in the art within the scope of the claims. Embodiments derived from a proper combination of technical means disclosed in different embodiments is encompassed in the technical scope of the present invention.

One or more embodiments of the present invention is suitably applicable to a device which applies, to an electric power supply, an energy harvesting technique which efficiently utilizes a limited energy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1: monitoring system
2: wireless sensor module
3: server (external device)
4: motor (measuring object)
5: housing
11: acceleration sensor
12: micro controller unit (control section)
13: wireless communication section
14: vibration power generator module
15: electric power storage device
16: reset IC

The invention claimed is:
1. A wireless sensor module, comprising:
a sensor that measures a measuring object to generate measured data;
a wireless communication section that wirelessly transmits the measured data to an external device and receives a radio signal from the external device;
a control section that controls the sensor and the wireless communication section;
a vibration power generator module that generates electric power by vibrations; and
a capacitor that stores therein the electric power generated by the vibration power generator module and supplying the electric power to the sensor, the wireless communications section, and the control section,
wherein a series of operations for processing the measured data are carried out, the series of operations including an operation in which the sensor generates the measured data and an operation in which the wireless communication section wirelessly transmits the measured data to the external device,
wherein the control section secures an idle period of time in the series of operations so that the series of operations are not carried out consecutively thereby keeping an output voltage of the capacitor during the series of operations and the idle period of time higher than an operable minimum voltage of each of the sensor, the wireless communication section, and the control section.
2. The wireless sensor module as set forth in claim 1, wherein the idle period of time is secured before or after a heavy load operation in which a relatively heavy load is applied to the capacitor, and
wherein the heavy load operation is included in the series of operations.

3. The wireless sensor module as set forth in claim 2,
wherein the idle period of time is set to a first length,
wherein the first length allows an increase in output voltage of the capacitor, the output voltage having been reduced due to an operation which is included in the series of operations and has been carried out before the idle period of time, and
wherein the first length does not cause the output voltage to become less than the operable minimum voltage of a device that carries out an operation which is included in the series of operations even when the control section, which is on standby, consumes electric power during the idle period of time.

4. The wireless sensor module as set forth in claim 1,
wherein the idle period of time is set to a first length,
wherein the first length allows an increase in output voltage of the capacitor, the output voltage having been reduced due to an operation which is included in the series of operations and has been carried out before the idle period of time, and
wherein the first length does not cause the output voltage to become less than the operable minimum voltage of a device that carries out an operation which is included in the series of operations even when the control section, which is on standby, consumes electric power during the idle period of time.

5. A method of processing measured data by use of a wireless sensor module,
wherein the wireless sensor module comprises:
a sensor that measures a measuring object so as to generate measured data;
a wireless communication section that wirelessly transmits the measured data to an external device and receives a radio signal from the external device;
a control section that controls the sensor and the wireless communication system;
a vibration power generator module that generates electric power by vibrations; and
a capacitor that stores therein the electric power generated by the vibration power generator module and supplying the electric power to the sensor, the wireless communications section, and the control section,
wherein the method comprises:
performing a series of operations for processing the measured data, the series of operations including an operation in which the sensor generates the measured data and an operation in which the wireless communication section wirelessly transmits the measured data to the external device,
securing an idle period of time in the series of operations so that the series of operations are not carried out consecutively thereby keeping an output voltage of the capacitor during the series of operations and the idle period of time higher than an operable minimum voltage of each of the sensor, the wireless communication section, and the control section.

6. A non-transitory computer-readable recording medium, in which a program for causing a computer to control a wireless sensor module is recorded,
wherein the wireless sensor module comprises:
a sensor that measures a measuring object so as to generate measured data;
a wireless communication section that wirelessly transmits the measured data to an external device and receives a radio signal from the external device;
a control section that controls the sensor and the wireless communication section;
a vibration power generator module that generates electric power by vibrations; and
a capacitor that stores therein the electric power generated by the vibration power generator module and supplying the electric power to the sensor, the wireless communications section, and the control section,
wherein a series of operations for processing the measured data are carried out, the series of operations including an operation in which the sensor generates the measured data and an operation in which the wireless communication section wirelessly transmits the measured data to the external device,
wherein the program causes a computer to carry out a control in which an idle period of time is secured in the series of operations so that the series of operations are not carried out consecutively thereby keeping an output voltage of the capacitor during the series of operations and the idle period of time higher than an operable minimum voltage of each of the sensor, the wireless communication section, and the control section.

* * * * *